United States Patent [19]
Barbier et al.

[11] Patent Number: 5,627,770
[45] Date of Patent: May 6, 1997

[54] SUPERHEAT GAGE WITH PLUG-IN DATA MODULE

[75] Inventors: William J. Barbier, Hazelwood; Andrew R. Chibnall, St. Louis, both of Mo.

[73] Assignee: Concept Technology, Inc, Hazelwood, Mo.

[21] Appl. No.: 570,081

[22] Filed: Dec. 11, 1995

[51] Int. Cl.$^6$ .................................................. G01N 27/00
[52] U.S. Cl. ...................... 364/558; 364/557; 364/509; 364/510; 62/225; 62/228.3; 62/127; 62/125; 73/700; 73/708
[58] Field of Search ........................... 364/558, 557, 364/509, 510; 62/225, 228.3, 126, 129, 127, 224, 223, 125, 149, 292; 374/143, 145, 16, 20, 101; 73/700, 708, 712, 714, 61.76; 340/626

[56] References Cited

U.S. PATENT DOCUMENTS

| | | | |
|---|---|---|---|
| 5,070,706 | 12/1991 | Waters et al. | 374/143 |
| 5,070,732 | 12/1991 | Duncan et al. | 374/143 |
| 5,157,928 | 10/1992 | Gaudet et al. | 62/127 |
| 5,265,431 | 11/1993 | Gaudet et al. | 62/126 |
| 5,311,745 | 5/1994 | Lockhart et al. | 62/127 |
| 5,392,639 | 2/1995 | Manz | 73/61.76 |

OTHER PUBLICATIONS

Cooper Instruments SH88A Superheat Calculator Flier, no date, pp. 1–4.

*Primary Examiner*—Emanuel T. Voeltz
*Assistant Examiner*—Hal D. Wachsman
*Attorney, Agent, or Firm*—Daniel Kramer

[57] ABSTRACT

A gage having sensors for observing temperature and pressure. The gage includes a display and an internal computer. A data cartridge separate from the gage but with an electrical plug type connection to it is supplied. The data cartridge has a non-volatile memory on which is stored data relating pressure and saturation temperature of a volatile refrigerant. A program is stored within the gage. The program contains instructions for measuring temperature and pressure from a source, retrieving from the data cartridge saturated temperature data corresponding to the observed pressure, calculating superheat or subcooling and displaying in sequence the observed pressure in absolute or gage terms, the corresponding saturated temperature, the observed temperature and the superheat or subcooling. And there are switch means for displaying in sequence the observed pressure, the stored temperature corresponding to the observed pressure and the difference between the observed temperature and the saturation temperature which corresponds to the observed pressure as well as the maximum and minimum pressures or superheats observed over a period.

20 Claims, 3 Drawing Sheets

SUPERHEAT GAGE WITH PLUG-IN DATA MODULE

BACKGROUND

1. Field of the Invention

The present invention relates to an electronic pressure gage intended primarily for use by people performing refrigeration service. The gage has a replaceable data memory. The data memory has stored therein saturated temperatures corresponding to pressures for a particular volatile fluid or refrigerant. The invention further relates to such gages that include a temperature measuring instrumentality. The invention further relates to such gages having a display and means for displaying any of pressure, temperature, saturated temperature corresponding to observed pressure or the numerical difference between such saturated temperature and the observed temperature. The invention further relates to such gages which further include memory means and means for storing and subsequently displaying the highest and lowest values of any displayable parameter.

2. Prior Art

Instruments for measuring superheat at the suction outlet of refrigeration evaporators are well known. One such instrument includes two temperature sensors, one to be placed at the refrigerant inlet of the evaporator and the second to be placed at the refrigerant or suction outlet. If the temperature at the suction outlet is higher than the temperature at the refrigerant inlet, the difference is considered to be the superheat. This system produces faulty results when the evaporator is designed with a high pressure drop or where the refrigerant is neither a pure fluid nor an azeotropic mixture. Other instruments embody pressure transducers and temperature transducers plus integrally stored switch selected data relating observed pressure with corresponding saturated temperature. One version of this type instrument can display both the observed data and the stored data and perform calculations involving both. One commercially available product has a memory within the gage casing having switch selected data for several volatile fluids or refrigerants.

Mechanical Pressure Gages:

Most refrigeration service people still employ mechanical gages with analog output. Such gages have Bourdon tubes actuating a rotary pointer which moves over a circular scale calibrated in pounds per square inch (psi) for pressures above atmospheric pressure and in inches of Mercury vacuum for pressures less than atmospheric pressure. A pressure five psi above atmospheric pressure would indicate 5 on the gage. A pressure five psi less than atmospheric would indicate 10 inches Mercury column vacuum or approximately 2 inches Mercury column for each psi. A perfect vacuum would read 30 inches of Mercury vacuum.

Mechanical refrigeration service gages, in addition to pressure markings, generally include scales from which saturated temperatures for common refrigerants such as CFC-12 (dichlorodifluoromethane) and HCFC-22 (monochlorodifluoromethane) can be read.

Azeotropes and Non-Azeotropes (Zeotropes):

In the past, every refrigerant either was a pure chemical or a constant boiling mixture of pure chemicals. Examples of pure chemicals employed as refrigerants are dichlorodifluormethane (CFC-12) and propane (HC-290). A mixture of chemicals which exhibits the same boiling and condensing characteristics as a pure chemical is called an azeotrope. An example of an azeotropic refrigerant is a mixture of HCFC-22 and CFC-115 (chloropentafluoroethane). A 50—50 mixture of these two refrigerants is known by the shorthand designation of R-502. Both pure chemicals and azeotropes have only a single saturated temperature corresponding to any pressure.

Many New Refrigerants, Some are Zeotropes:

In the past the period between the introduction of new refrigerants usually corresponded to the lifetime of the equipment. However, with the discovery by Roland and Molina of the potential devastating effect of chlorofluorocarbon refrigerants (CFC's) on the stratospheric ozone layer and with the effectuation of the Montreal Protocol in which most of the producing nations of the world agreed to stop production of CFC refrigerants, there came a flood of new refrigerants. Each month new refrigerants are offered to the trade, each new refrigerant having a new composition and requiring new characteristics relating saturated temperature corresponding to observed pressure. Further, because of the desire of refrigerant manufacturers to provide new, non-ozone damaging, refrigerants whose characteristics match those of the soon-to-be-banned CFC refrigerants, many of the new refrigerants are mixtures of fluids which are not azeotropes and therefore do not act like pure fluids in that they do not have a single saturated temperature corresponding to a single pressure. These mixtures are called non-azeotropes or zeotropes.

Zeotropic Mixtures:

Zeotropic mixtures do not have a single saturation temperature corresponding to a single pressure. Instead a sample of such a zeotropic fluids boils and condenses away over a range of temperatures, called "the glide".

Zeotropic Mixtures: Bubble Point, Mid-point, Dew Point:

When a zeotropic mixture is held at a fixed pressure and warmed, the first bubbles appear at the "bubble point temperature". The last vestige of liquid boils away at a higher temperature called the "dew point temperature". The average between the bubble point temperature and the dew point temperature is called the mid point temperature.

Saturation Temperature for Performance:

In refrigeration design, testing and service, knowledge of an accurate value of saturated temperature corresponding to an observed or predicted pressure is very important. Values of saturated temperature are almost always employed instead of actual measured temperatures, in tests for determining the performance of refrigeration evaporators, where transitions from liquid to vapor, and of condensers, where transitions from vapor to liquid, are occurring. Also, the values of saturated temperature are always employed where a measure of the superheated condition the condition of a vapor or the subcooled condition of a liquid is sought.

Saturation Temperature and Superheat:

At the refrigerant vapor outlet of most evaporators it is expected that only vapor will be present. The number of degrees that the vapor is warmer than the saturation temperature corresponding to the actual pressure of the vapor is called the vapor superheat. The superheat is a measure of how much of the evaporator is effective in the cooling process. A high superheat suggests that much of the evaporator is not being used for evaporation, a highly effective mode of heat transfer, but instead is being employed for superheating the refrigerant vapor, a heat transfer mode which is much less effective than the evaporation mode.

Saturation Temperature and Subcooling:

At the refrigerant liquid outlet of condensers, where it is expected that only liquid refrigerant will be present. The number of degrees that the liquid temperature is cooler than the saturation temperature corresponding to the liquid pressure is called the liquid subcooling. A high degree of subcooling suggests that much of the condenser is not being used for condensing vapor, an effective heat transfer mode, but instead is being employed for subcooling, a much less effective mode of heat transfer.

Dew Point, Mid Point and Bubble Point Temperatures; Uses:

When employing zeotropic mixtures as refrigerants, the dew point temperature corresponding to a given pressure is employed to determine superheat; the bubble point temperature corresponding to a given pressure is employed to determine subcooling; and the mid point temperature is employed to determine performance.

Effect of Altitude on Gage Readings:

When the service person read her analog mechanical gage, she assumes that the pressure she reads is the pressure inside the tube or vessel to which her gage is attached. This is a valid assumption when she and the gage she is using are at sea level. In that case the reference pressure seen by the outside of the Bourdon tube is about 14.7 psi and the pressures indicated by the needle are indicated with reference to that reference pressure.

However, when the service person is in Denver, the atmospheric pressure is about 2.5 psi less than atmospheric. When the service-persons gage reads 0 psi, the actual pressure in the system she is measuring is not 14.7 psia but 12.2 psi. When performing service on an air-conditioner employing HCFC-22 as refrigerant, this difference will result only in about a 3.5 F error in estimating the saturation temperature of the refrigerant. However, if the service person is attempting to analyze a problem with a centrifugal compressor employing CFC-11 (trichlorofluoromethane) the 2.5 psi difference will result in a 14 F mistake in estimating saturation temperature, a potentially disastrous difference.

Altitude Correction:

Refrigeration service-people generally have in their possession printed cards called pressure-temperature charts. these charts have printed thereon tables, setting forth for a number of refrigerants, a wide range of gage pressures and corresponding saturated temperatures. These charts are correct only when the gage used to measure the pressures for entry into the chart is at sea level. At altitudes higher or lower than sea level the service person must correct her gage reading by the difference between the atmospheric pressure at her location and atmospheric pressure at sea level.

Need for New Gage, Objectives of Present Invention:

In view of the difficulties of accurate pressure measurement in refrigeration systems, the proliferation of many new refrigerants, the need to be able to use a gage accurately at altitudes, the need to conform to stringent governmental codes, some of which having criminal consequences, the need to cope with zeotropic refrigerants having more than one important temperature corresponding to each pressure, and the need to enable lesser skilled service personnel to observe and reach accurate conclusions about the systems they are observing, the present invention has the following objectives:

To provide an electronic pressure gage with an addressable data memory for displaying saturated temperature as well as pressure.

To provide such a gage having temperature sensing means and means for displaying the difference between measured temperature and saturated temperature.

To provide such a gage where the data memory is an external replaceable element, whereby new elements containing characteristics of new refrigerants can be secured.

To provide such a gage where maximum and minimum values of a displayable variable can be stored and displayed.

To provide a gage where either superheat or subcooling can be measured and displayed and identified.

To provide such a gage capable of interfacing with and providing accurate superheat and subcooling measurements with zeotropic as well as pure and azeotropic refrigerants.

To provide such a gage having a removable temperature sensor where the gage senses the presence of the sensor and displays superheat or subcooling when the temperature sensor is present and saturated temperature and pressure only when the sensor is absent.

To provide such a gage having a pressure sensor which responds to absolute pressure, further including zeroing means whereby the absolute value of the ambient atmospheric pressure is read before pressure connection to a source is made and the value of the ambient pressure is stored.

To provide such a gage where the displayed pressure is gage pressure, that is the pressure with respect to the ambient atmospheric pressure, while the saturated temperature, displayed and employed for superheat calculations, is based on the absolute pressure.

To provide such a gage where the external memory containing the refrigerant characteristics is applicable to zeotropic refrigerants and where the external memory for such refrigerants includes both the dew point temperature and the bubble point temperature for each pressure.

To provide such a gage where the external memory containing the refrigerant characteristics is applicable to zeotropic refrigerants and where the external memory for such refrigerants includes either the dew point temperature or the bubble point temperature for each pressure.

To provide such a gage which displays the midpoint temperature corresponding to a measured pressure when the temperature sensor is disconnected.

To provide such a gage which displays and employs the dew point temperature when the observed temperature is higher than the dew point temperature and employs and displays the bubble point temperature when the observed temperature is lower than the bubble point temperature.

Further advantages and objectives will become apparent as the design, construction and operation of the invention is more fully disclosed herein.

SUMMARY OF THE INVENTION

An electronic pressure gage having power supply, a casing and at least one separate but addressable refrigerant data memory external of the casing. The gage includes an attachable temperature sensor. A pressure connection for attaching the gage to a pressure source. Pressure transducer means within the casing, first for observing and responding to ambient atmospheric pressure and storing a value related to the atmospheric pressure and second for observing and respond to absolute pressure from the source, for transmitting the absolute pressure to the data memory and for receiving a refrigerant specific temperature related to the observed pressure. And means within the gage casing for displaying the difference between the observed atmospheric pressure and the observed absolute pressure from the source as gage pressure and for displaying the refrigerant specific temperature related to the observed pressure.

BRIEF DESCRIPTION OF THE DRAWINGS

The foregoing summary, as well as the following description of the preferred embodiments, will be better understood when read in conjunction with the appended drawings. For the purpose of illustrating the invention, there is shown in the drawings an embodiment which is presently preferred, it being understood, however, that the invention is not limited to the specific instrumentalities or the precise arrangement of elements disclosed.

DETAILED DESCRIPTION OF THE INVENTION

Figure 1:
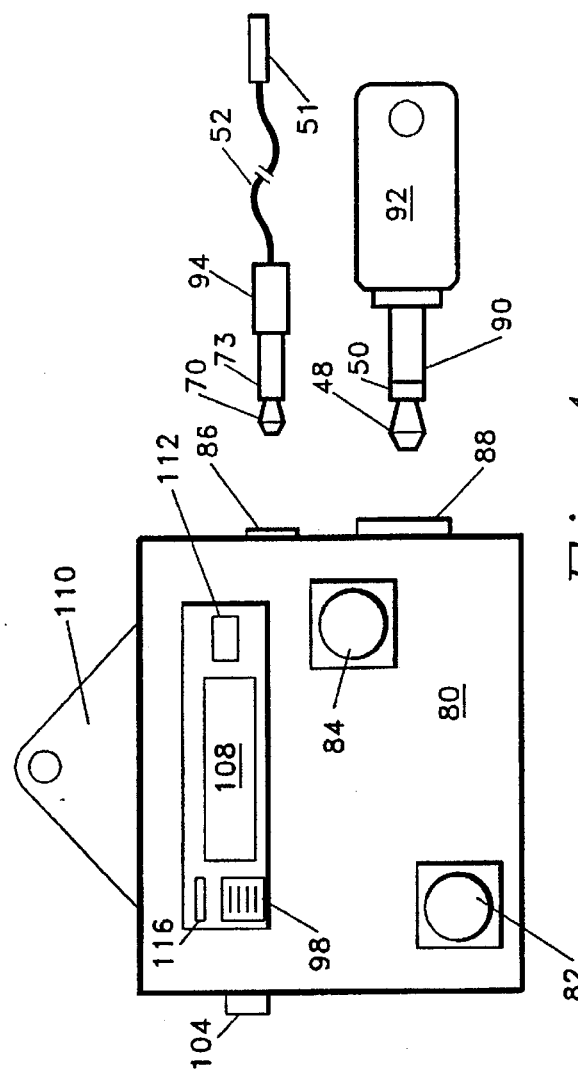
FIG. 1 is a front view of the gage casing with separate refrigerant data memory and attachable temperature sensor.

Referring now to the drawings, wherein like references are used to indicate like elements, there is shown in FIG. 1 a front view of a pressure gage assembly of the present invention. The gage assembly comprises the following main elements: a gage casing 80 having main display 108 and secondary displays 98, 112 and 116, a pressure fitting (FIG. 2), a socket 88 for receiving a plug-in refrigerant key 92 and a socket 86 for receiving a plug-in temperature sensing element 94, 52, 51. Plug 94 has electrical conductors 70 and 73 which provide a conductive path to gage 80 through socket 86. There is a hanger 110 from which the gage casing 80 can be hung or supported while readings are being made. The plug-in element refrigerant key 92 has male electrical plug 90 and electrical conductors 48 and 50 for coacting with its socket 88 in gage casing 80.

Within the gage casing (FIGS. 3 and 4) are memories for storing data and programs, analog to digital (A/D) converters and a battery for powering the electronic circuitry. Externally available controls for operating the gage are zeroing button 82, function button 84 and on-off switch 104.

Figure 2:
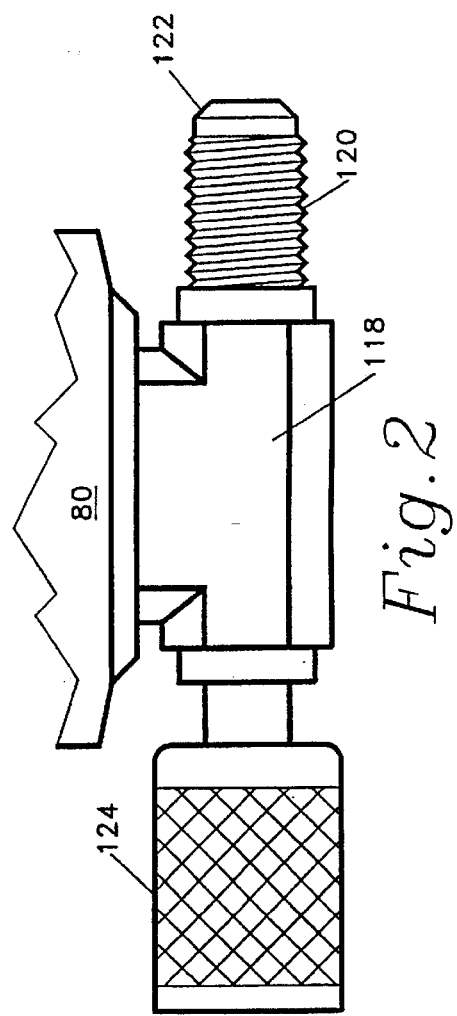
FIG. 2 is a view of the back of the gage showing the passthrough refrigerant connection.

Referring now to FIG. 2, there is shown attached to gage casing 80 a pressure fitting 118 to which are attached female connection 124 and male flare fitting having threads 120 and sealing surface 122. While the fitting 118 may be rigidly or flexibly connected to the gage casing, in the instant case it is rigidly connected to the back of the casing and therefore is not viewable in FIG. 1. It is normal practice for a service person to have in her kit hoses having fittings which can be screwed onto the male fitting for pressure connection. Female connection 124 has internal threads like threads 120 to mate with a male connection exactly like male connection 120, 122. The service person will cap or plug the unused connection at the time pressure connection to the desired male or female fitting is made. There is a common internal passage 24 to the pressure transducer 26 (FIG. 3) from both the male and female pressure connections.

The replaceable refrigerant key 92 contains a non volatile memory on which is stored pressure and saturated temperature data over a range of pressures, for a specific refrigerant Y or volatile fluid. A brief example of such data is the following series of entries for tetrafluoroethane, also known in the refrigeration industry as HFC-134a, a pure fluid. Mixtures of fluids having properties of azeotropes have similar characteristics, that is, one saturated temperature corresponding to one pressure.

| Gage Pressure (Based on Sea-level) | HFC-134a Sat. Temp. F. | Absolute Pressure |
|---|---|---|
| 5" Hg vac | −22 | 12.25 psia |
| 0 psig | −15 | 14.7 psia |
| 10 psig | 7 | 24.7 psia |
| 20 psig | 22 | 34.7 psia |
| 40 psig | 45 | 54.7 psia |
| 80 psig | 76 | 94.7 psia |
| 120 psig | 98 | 134.7 psia |
| 160 psig | 116 | 174.7 psia |

Each time a pressure is observed by the gage and its data transmitted to the refrigerant key 92 via the electrical circuitry, the memory responds with the corresponding saturated temperature data. Although, in the preferred embodiment, the data is stored in the form of the table above, in other embodiments the data is stored in the form of coefficients for a polynomial or other type equation whereby the processor or data router 40 can evaluate the saturated temperature as a dependent variable, as a function of the input pressure independent variable.

Figure 3:
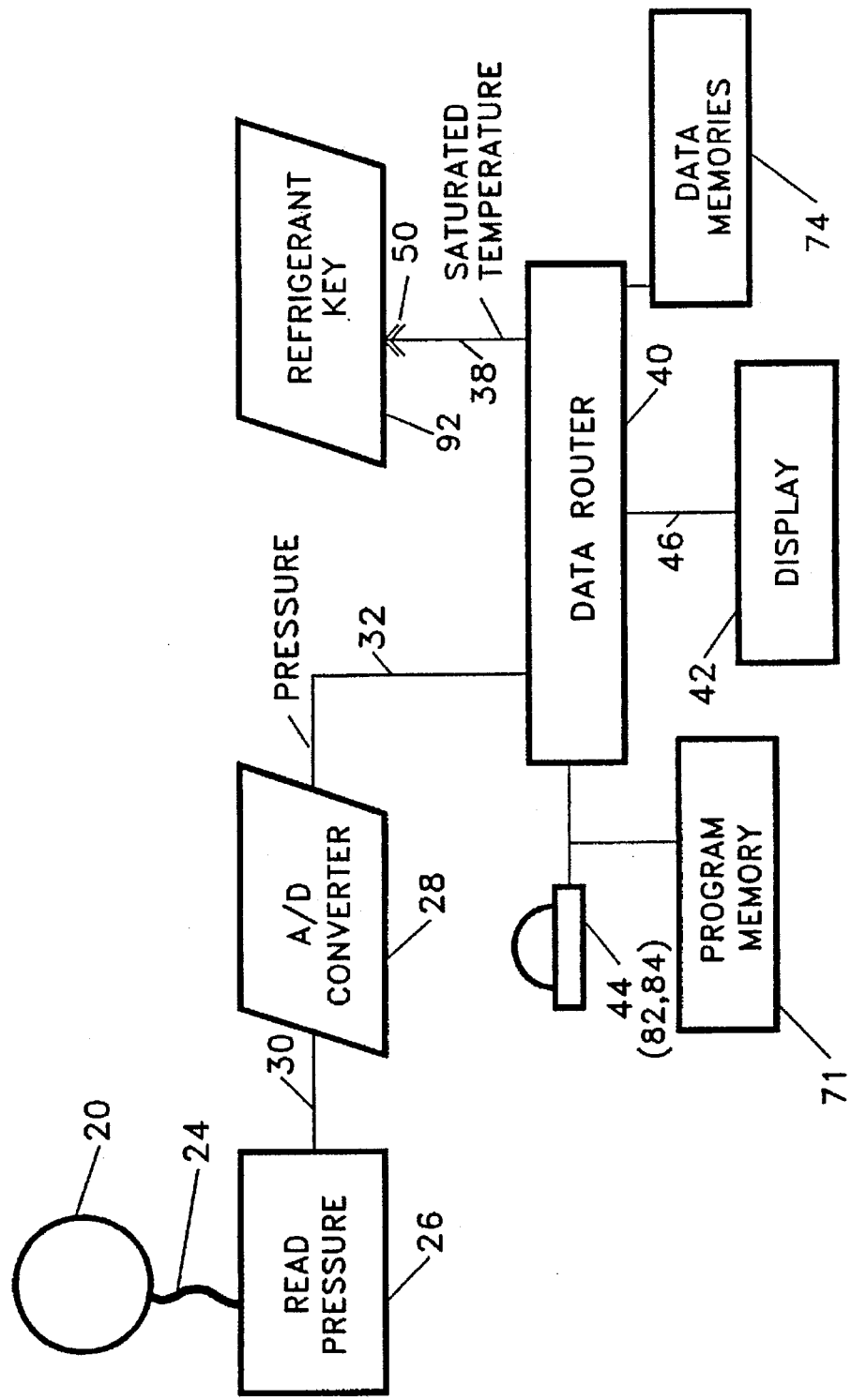
FIG. 3 is a logic diagram illustrating a logical mode for reading and displaying either observed pressure or saturated temperature.

In FIG. 3, there is shown the logical diagram for a preferred version of the electronics positioned within the gage casing when operating with temperature sensor 51,94 not plugged into socket 86 of the gage casing. For simplicity no power supply is shown, though a current source is required. Within pipe 20 resides a specific pure or azeotropic refrigerant Y having a pressure temperature relationship stored on the non-volatile memory within refrigerant key 92. The key 92 is removably connected to the gage circuit by connectors 48 and 50. These connectors are part of plug 90 of the key and socket 88 of the gage. An absolute pressure transducer 26 is connected by a gage connection 118 of FIG. 1 to pipe 20. Absolute pressure transducers produce an output which is responsive to absolute pressure. Typically they comprise a strain gage or network which is stressed by the movement of a flexible diaphragm biased on one side by a near perfect vacuum and on the other side by the pressure to be measured. As the diaphragm flexes by action of an imposed pressure, the strain gage is stressed and provides an electrical output which corresponds to the imposed pressure. This output is analog. A scaling device, frequently combined with an analog to digital (A/D) converter 28, converts the analog output to a digital output.

While she may not be aware of it, the user of a refrigeration gage has need of two pressures. First, she requires knowledge of the pressure inside the pipe 20 with respect to the ambient atmospheric pressure. This is so she can properly purge and evacuate and pressurize the vessel or system to which her gage is attached. Ordinary analog mechanical gages having Bourdon tubes perform this function perfectly. No matter what the atmospheric ambient pressure, the gage needle moves only with respect to the pressure difference between the inside and the outside of the gage Bourdon tube. When the service person sees her gage at zero pressure, she knows that she can open the system or vessel without sucking in air or losing refrigerant. However, when she wishes to determine the saturated temperature corresponding to an observed pressure, she must independently observe the atmospheric pressure employing a barometer, which reads the absolute atmospheric pressure, and correct her Bourdon tube gage reading to that reading she would have observed had she been at sea level. Therefore, having the barometric pressure in inches mercury, she must add an excess over 30 inches to her gage reading if she is lower than sea level, or subtract the decrement under 30 inches from her gage reading if she is at an altitude over sea level. This process becomes even more difficult when such addition or subtraction results in a transition in gage reading from vacuum to pressure or pressure to vacuum. As pointed out above small differences in altitude or barometric pressure are of small significance in ordinary service work with high pressure refrigerants at the evaporating temperatures found in airconditioning systems. However, even small differences uncorrected can lead to disastrous mistakes when dealing with low pressure refrigerants such as CFC-11 or with high pressure refrigerants such as R-502 when functioning in low temperature systems where a small pressure difference can signal many degrees difference in saturated temperature.

The gage of the present invention, having an absolute pressure transducer and a zeroing procedure, allows the user to view the actual gage pressure (that is the difference between the system pressure and the ambient atmospheric pressure) in the digital display, exactly as if she were employing a mechanical Bourdon tube gage, while simultaneously having available the true absolute pressure of the refrigerant in the system or vessel to address the data in the refrigerant key, from which the true saturated temperature is withdrawn from the key and stored or displayed.

Zeroing Process:

The zeroing process simply requires that the service person depress the zeroing button 82 just before connecting pressure connection 124 or 122 to the pressure source. This causes the pressure transducer 26 to read the absolute atmospheric pressure and send the analog value to A/D converter 28 by path 30 where the analog pressure is converted to digital form. The stored program in memory 71 directs the data router 40 to read the digital absolute pressure and to store this pressure in one of the data memories 74 where it can be recalled whenever the mode button 84 has been pressed the number of times required for the desired function.

Displaying Gage Pressure:

In the pressure display process the pressure in pipe 20 is read by the absolute pressure transducer 26, transmitted by path 30 to A/D converter 28 and there converted to digital form. The stored program in non-volatile memory 71 now directs the data router 40 to subtract the absolute value of the barometric pressure, stored in memory 74 during the zeroing process, from the digital value of the pressure observed in pipe 20. The program then directs data router 40 to transmit the difference via path 46 to display 42 as gage pressure. Data router 40 may be in the form of a central processing unit (CPU) such as Intel model 286 processor, or in another form.

At Sea Level:

For example, a refrigerant key 92 having pressures and saturated temperatures for refrigerant HFC-134a has been plugged into socket 88 of gage 80. The operator, located in Atlantic City, N.J. at sea level, has actuated the zeroing process and observed and stored an absolute value of the atmospheric pressure of 14.7 psia before the gage was connected to a pressure source. The absolute pressure later observed within pipe 20 was 24.7 psia. Then the display would show 10 (24.7−14.7) psig. The data router 40, under instructions from the program stored in memory 71, would transmit the absolute pressure, 24.7 psia, to key 92 via path 38. Key 92 would return 7F, the saturated temperature for HFC-134a, (see HFC-134a table above), corresponding to an absolute pressure of 24.7 psia.

At Altitude:

If the operator moved the system from Atlantic City to Denver, Colo. where the atmospheric pressure is 12.2 psia and observed the same pressure in pipe 20, her gage would now correctly read 12.5 psig (24.7−12.2) but the saturated temperature for HFC-134a at 24.7 psia would still be correctly displayed as 7 F because only the absolute pressure of 24.7 psia was transmitted to key 92.

Figure 4:
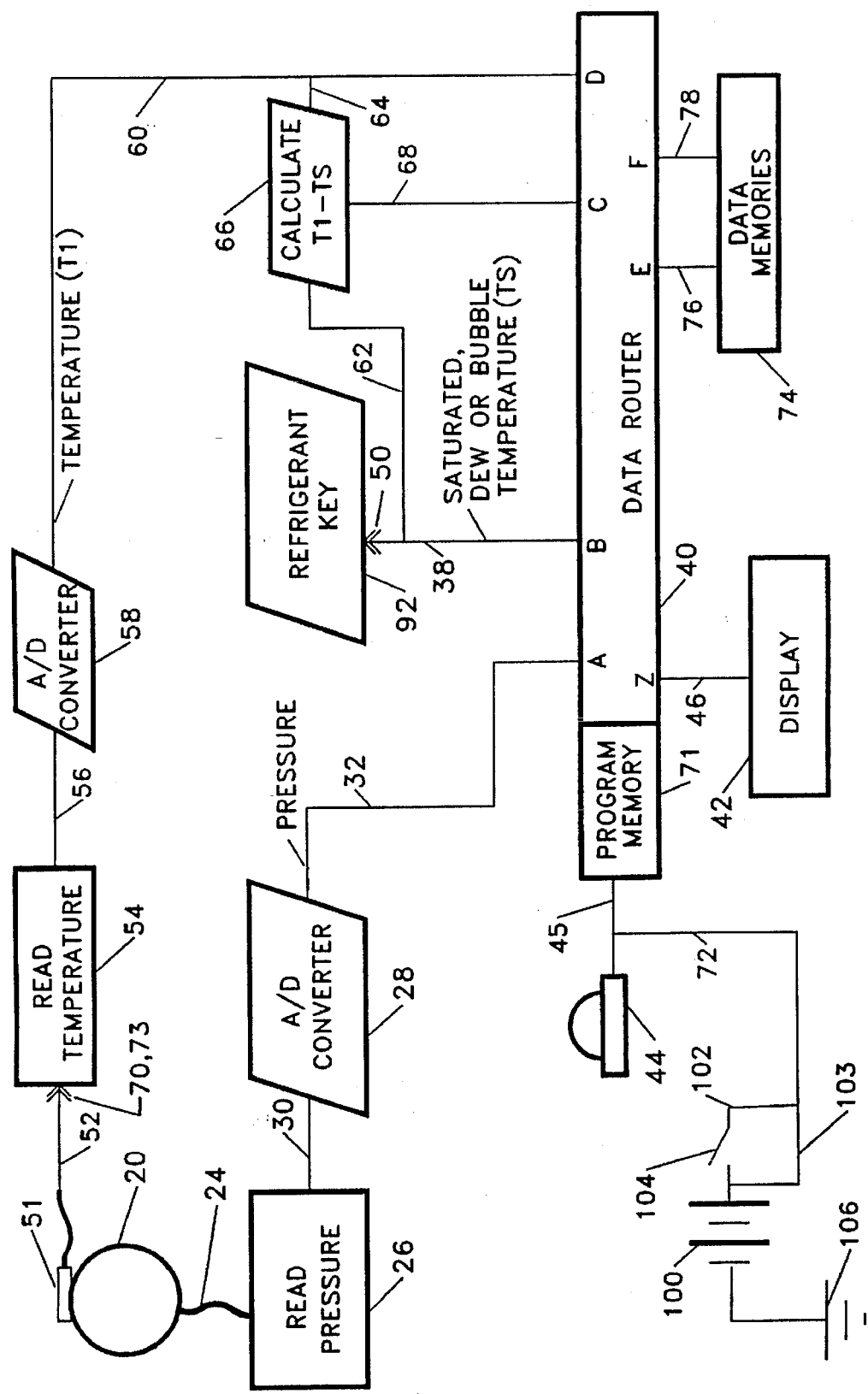
FIG. 4 is a logic diagram illustrating a logical mode for measuring temperature and pressure of a refrigerant and displaying superheat or subcooling including a stored program for comparing, calculating and storing one or more observed or calculated variables and for displaying them.

Timed Shut-off:

In FIG. 4 the logical paths for another preferred embodiment of the superheat gage is shown. Battery 100 supplies electrical power to the electronic components via path 102 and common 106. Momentary manual on-off switch 104 initiates power to the system. On sensing power the program actuates a timing network that bypasses switch 104 via path 103. In the preferred version of the instrument, power is turned off by the timing network after 15 minutes.

Temperature Measurement:

Pipe 20 contains refrigerant Y at a temperature and pressure. Temperature sensor 51 is securely fastened to the surface of pipe 20 and, preferably, insulated from the surrounding environment so that the temperature of sensor 51 is substantially the same as that of the refrigerant in pipe 20. Conductor 52 conveys, via contacts 70,73, the temperature characteristic of sensor 51 to network 54 which scales the characteristic of sensor 51 and transmits the characteristic via path 56 to A/D converter 58, whose output via path 60 carries a digital representation of the temperature of sensor 51 to data router 40 and by branch path 64 to difference engine 66. The stored program may direct data router 40 to store one or more measured temperatures in data memory 74.

Superheat/Subcooling Measurement:

Pressure conduit 24 conveys the pressure within pipe 20 to absolute pressure transducer 26 whose output is transmitted via path 30 to A/D converter 28. The digital output of A/D converter 28, which represents the absolute pressure within pipe 20, is delivered via path 32 directly to data router 40. Data router 40 queries key 92 with the absolute pressure via path 38. Key 92 responds, to data router 40 via path 38 and to difference engine 66 via path 62, with the saturated temperature corresponding to the absolute pressure input. The difference output of difference engine 66 is transmitted via path 68 to data router 40. This difference is either the superheat or the subcooling, depending on whether the measured temperature is greater than the corresponding saturated temperature returned by key 92 or less (subcooling).

superheat Variation:

In still another embodiment of the invention there is stored within program area 71 steps directing CPU 40 to provide two memory spaces within volatile storage area 74. From a continuous string or sequence of differences between observed temperature and corresponding saturated temperature, in the first space the CPU stores a higher value of such difference. In the second space the CPU stores a lower value of such difference.

The CPU then compares each new successive difference with the stored higher and lower difference values. If the new difference is higher than the higher stored value in the first storage, the CPU replaces the higher stored value with the new higher difference value. In like manner, if the new difference is lower than the difference value stored in the second storage, the CPU replaces the value in the second storage with the new lower difference value.

A display sequence initiated by push button 84 allows the operator to display in sequence the contents of the two memories, thereby allowing the operator to monitor variations in superheat or subcooling over a time period.

Preset Functions:

The program stored in program memory 71 has several preset functions which are selected in round robin sequence by successive presses of push button 44. The preferred sequence of consecutive displays depends on whether refrigerant key 92 and or temperature sensor 51, 94 are plugged into gage 80. If neither is plugged in, successive presses of button 44 will produce only displays of pressure. If the temperature sensor is plugged in to the gage but not the refrigerant key 92, successive presses of button 44 will display in sequence pressure and actual measured temperature. If the refrigerant key 92 is plugged in to the gage and not the temperature sensor, successive presses of button 44 will display in sequence measured pressure and saturated temperature corresponding to the measured pressure. If both the refrigerant key 92 and the temperature sensor 51, 94 are plugged into the gage 80, successive button presses will display pressure, saturated temperature, actual measured temperature, and superheat/subcooling.

Stored Refrigerant Data:

In another embodiment of the invention the program stored in program memory 71 also includes stored pressure and saturated temperature data for a specific refrigerant deemed to be most likely to be encountered by a service person. This data would be accessed if no refrigerant key 92 were plugged into gage casing 80. However, on sensing the presence of key 92, the program will download saturated temperatures from the inserted key 92 and ignore the resident saturated refrigerant data.

Display Icons:

In each case the program illuminates or otherwise identifies a display icon 116, 112 or 98 thereby identifying the contents and units of the display. In a preferred embodiment of the invention icons indicating temperature scales in F or C, pressure in KPa or psi or inches mercury and either superheat or subcooling would indicate the contents of the display.

In another embodiment of the invention, there is stored within program area 71 steps directing the data router/CPU 40 to compare the temperature observed by sensor 51 with the saturated temperature returned by key 92. If the observed temperature is less than the reported saturated temperature, the CPU 40 will direct the display to indicate the presence of subcooling. If the observed temperature is greater than the reported saturated temperature, the CPU 40 will direct the display to indicate the presence of superheat. If the observed temperature is the same as the reported saturated temperature, the CPU 40 will direct the display to indicate a saturated condition. The superheat, subcooling and saturated icons are located in one of the display areas 98, 112 or 116.

Pressure Variation:

In still another embodiment of the present invention there is stored within program area 71 steps directing the CPU 40 to provide two memory spaces within volatile data storage area 74. From a sequence of pressure readings, in the first space the CPU 40 stores a higher value of observed pressure and in the second space a lower value of observed pressure. the CPU 40 then compares each new successive observed pressure with the pressures stored in the first and second storage areas. If a new pressure is higher than the highest stored pressure value, the CPU replaces the stored pressure with the new higher pressure. If the new successive pressure is lower than the lowest stored pressure value, then the CPU replaces the lower stored pressure with the new lower pressure. A display sequence selected by push button 84 allows the operator to display in sequence the contents of the two memories, thereby allowing a service person to quantitatively monitor extreme pressure excursions within pipe 20.

Zeotropes:

A more complicated problem arises when the refrigerant contained in pipe 20 and whose characteristics are stored in key 92 is neither a pure fluid, which at a given pressure evaporates and condenses at a constant temperature, nor an azeotropic mixture which acts like a pure fluid during evaporating and condensation. Such fluid mixtures, having a specific composition, are called zeotropes, and evaporate and condense over a range of temperatures. That temperature range is called the glide. When the non-bubbling or sub-cooled mixture, held at a given pressure, is warmed, the first bubbles occur at a temperature called the bubble point. As the pool of liquid evaporates over the glide temperature range, the last vestige of liquid to evaporate does so at a temperature called the dew point. The dewpoint temperature is the same temperature at which the first droplet of liquid would form on a gradually cooled surface held in a gaseous atmosphere having the specific mixture composition. An example of a zeotropic composition is refrigerant having ASHRAE classification R-401A. This refrigerant, also identified by DuPont with its trademarked designation "Suva MP39" has a composition of 53 weight percent chlorodifluoromethane (HCFC-22), 13 weight percent difluoroethane (HFC152a) and 34 weight percent of tetrafluoroethane (HF-134a). The numerical designations and their chemical composition of this and other pure, azeotropic and zeotropic refrigerants can be found in ASHRAE Standard 34, Titled, "Number Designation and Safety Classification of Refrigerants".

Over a limited range of pressures, R-401A has the following approximate properties:

| | | R-401A | | |
|---|---|---|---|---|
| Pressure Psig (Re Sea Level) | Dew Point F | Bubble Point F | Mid-Point F | Pressure Psia |
| 20 | 20 | 12 | 16 | 35 |
| 40 | 43 | 35 | 39 | 55 |
| 60 | 60 | 53 | 56.5 | 75 |
| 80 | 75 | 67 | 71 | 95 |
| 100 | 86 | 79 | 82.5 | 115 |
| 120 | 97 | 90 | 93.5 | 135 |
| 140 | 106 | 99 | 102.5 | 155 |
| 160 | 115 | 108 | 111.5 | 175 |
| 180 | 122 | 116 | 119 | 195 |
| 200 | 130 | 123 | 126.5 | 215 |

To cope with this situation, the refrigerant key 92 has stored in its memory both the dew point and the bubble point temperatures corresponding to each absolute pressure. In response to the input of an absolute pressure from A/D pressure converter 28 via router 40, the key responds with both the dew point and the bubble point temperatures which are temporarily stored is data memories 74. In an alternate embodiment of the invention, the key has stored only one of the dew point or the bubble point temperatures corresponding to each absolute pressure and responds only with the stored temperature in response to the input of an absolute pressure.

If the presence of the temperature sensor 51 has been detected, the program then compares the digital form of the observed temperature with the dewpoint. If the observed temperature is higher than the dewpoint, the program calculates the difference between the dew point and the observed temperature and displays the difference as superheat. If the observed temperature is lower than the dewpoint, the program then compares the observed temperature with the bubble point. If the observed temperature is lower than the bubble point, the program calculates the difference between the bubble point and the observed temperature and displays the difference as subcooling.

If the temperature sensor has not been detected, then the program takes the arithmetic average of the bubble point and dew point temperatures and displays the average as the closes approximation to the saturated temperature corresponding to the observed pressure.

For simplicity only one logical push button 44 is shown, though two, 82 and 84, are provided on the gage casing 80 shown in FIG. 1. Though the A/D converters 28, 58, the data memories 74, the difference engine 66, the data router 40 and the program memory 71 are shown as separate elements, the distribution of these functions is dependent on the available software and hardware and all of them may be embodied within a single integrated circuit package.

From the foregoing description, it can be seen that the present invention comprises an advanced pressure / temperature gage with external memory for refrigerant characteristics. It will be appreciated by those skilled in the art that changes could be made to the embodiments described in the foregoing description without departing from the broad inventive concept thereof. It is understood, therefore, that this invention is not limited to the particular embodiment or embodiments disclosed, but is intended to cover all modifications which are within the scope and spirit of the invention as defined by the appended claims.

I claim:

1. A pressure gage having a casing and a display, said gage comprising:

means for supplying electrical power to the gage, means for connecting the gage to a pressure source whereby a pressure from the source is communicated to the gage, transducer means within the casing for responding to the pressure and generating an electrical response, including data, related to the pressure, first non-volatile memory means positioned within the gage casing for storing pressure data and corresponding saturated temperature data, the data being applicable to a first volatile fluid, and means for transferring pressure data from the transducer means to the first non-volatile memory means and for receiving from the first memory means saturated temperature data corresponding to the pressure data, a unitary memory module separate from the gage casing, including interface means comprising corresponding socket means for mutual engagement between the module and the gage and for providing two way communication between the gage and the memory module for receiving data from the gage and for transmitting data to the gage, second non-volatile memory means positioned within the module and connected to the interface means for storing pressure data and corresponding saturated temperature data applicable to a second volatile fluid, means positioned within the gage for transmitting to the module data corresponding to the source pressure and for receiving from the second memory means saturated temperature data corresponding to the pressure data, and further providing that the condition of mutual engagement of the interface means between the unitary memory module and the gage enables data transfer between the gage and the second non-volatile memory means within the unitary memory module and disables data transfer between the gage and the first non-volatile memory means positioned within the gage casing, and means for conditioning to a displayable form and for displaying data selected from the group consisting of the pressure and a saturated temperature corresponding to the pressure.

2. A pressure gage as recited in claim 1 further providing temperature sensing means connected to the gage casing for sensing a temperature value, and further providing means for converting the temperature value to data corresponding to the sensed temperature.

3. A pressure gage as recited in claim 2 further providing means for subtracting the sensed temperature data from the saturated temperature data corresponding to the measured pressure data, for securing a difference, and for conditioning to a displayable form and for displaying the difference.

4. A pressure gage as recited in claim 2 further providing means for sensing whether the sensed temperature is greater or less than the temperature corresponding to the source pressure data.

5. A pressure gage as recited in claim 4 further providing means for indicating the presence of superheat when the sensed temperature is greater than the temperature corresponding to the source pressure data.

6. A pressure gage as recited in claim 4 further providing means for indicating the presence of subcooling when the sensed temperature is less than the temperature corresponding to the source pressure data.

7. A pressure gage having a casing and a display, said gage comprising:

means for supplying electrical power to the gage, means for connecting the gage to a pressure source for receiving a pressure, transducer means within the casing for responding to a received pressure and generating an electrical response including data, related to absolute pressure, means for receiving the ambient atmospheric absolute pressure and for storing data related to ambient atmospheric pressure prior to connection of the gage to a pressure source, a unitary memory module separate from the gage casing, including interface means, for providing two way communication between the gage and the memory module for receiving data from the gage and for transmitting data to the gage, non-volatile memory means positioned within the module and connected to the interface means for storing pressure data and corresponding saturated temperature data applicable to a volatile fluid, means positioned within the gage for transmitting to the module data corresponding to the received absolute pressure and for receiving from the module memory means, saturated temperature data corresponding to the absolute pressure data, and means for conditioning to a displayable form and for displaying data selected from the group consisting of the absolute pressure and the saturated temperature corresponding to the absolute pressure.

8. A pressure gage as recited in claim 7 further providing that the means for conditioning and displaying data includes means for subtracting the stored absolute ambient atmospheric pressure from the source absolute pressure to secure a difference and for displaying the difference.

9. A pressure gage as recited in claim 7 further providing temperature sensing means connected to the gage casing for sensing a temperature value, and further providing means for converting the temperature value to data corresponding to the sensed temperature.

10. A pressure gage as recited in claim 9 further providing means within the gage for subtracting the sensed temperature data from the saturated temperature data corresponding to the measured pressure data, for securing a difference, and for conditioning to a displayable form and for displaying the difference.

11. A pressure gage as recited in claim 10 further providing means for sensing whether the sensed temperature is greater or less than the temperature corresponding to the measured pressure data.

12. A pressure gage as recited in claim 11 further providing means for indicating the presence of superheat when the sensed temperature is greater than the corresponding temperature.

13. A pressure gage as recited in claim 11 further providing means for indicating the presence of subcooling when the sensed temperature is less than the temperature corresponding to the measured pressure data.

14. A pressure gage having a casing and a display, said gage comprising:

means for supplying electrical power to the gage, means for connecting the gage to a pressure source whereby a pressure from the source is communicated to the gage, transducer means within the casing for responding to the pressure and generating an electrical response, including data, related to the absolute value of the pressure, further providing two resettable memories, a first memory for storing higher values of pressure and a second memory for storing lower values of pressure, and means for comparing each successive pressure reading with the values stored in the first and second memories and for replacing the value stored in the higher value memory with a successive pressure value higher than the stored value and the pressure stored in the lower value memory with a successive pressure value lower than the stored value, a unitary memory module separate from the gage casing, including interface means, for providing two way communication between the gage and the memory module for receiving data from the gage and for transmitting data to the gage, non-volatile memory means positioned within the module and connected to the interface means for storing pressure data and corresponding saturated temperature data, the data being applicable to a volatile fluid, means positioned within the gage for transmitting to the module data corresponding to the pressure and for receiving from the first memory means saturated temperature data corresponding to the pressure data, and means for conditioning to a displayable form and for displaying data selected from the group consisting of the pressure, the saturated temperature corresponding to the pressure and the contents of the first and second resettable memories.

15. A pressure gage having a casing and a display, said gage comprising;

means for supplying electrical power to the gage, means for connecting the gage to a pressure source for receiving a pressure, transducer means within the casing for responding to the pressure and generating an electrical output, including data, related to the pressure, a unitary memory module separate from the gage casing, including interface means, for providing two way communication between the gage and the memory module for receiving data from the gage and for transmitting data to the gage, said interface means comprising corresponding socket means for mutual engagement between the module and the gage, non-volatile memory means positioned within the module and connected to the interface means for storing pressure data and corresponding saturated temperature data applicable to a volatile fluid, means positioned within the gage for transmitting to the module data corresponding to the pressure and for receiving from the memory means saturated temperature data corresponding to the pressure data, and further providing temperature sensing means for sensing a temperature value, the temperature sensing means being detachably connected to the gage casing and means within the gage casing for converting the temperature value to data corresponding to the sensed temperature, means within the gage for subtracting the sensed temperature data from the saturated temperature data corresponding to the measured pressure data, for securing a saturated-sensed temperature difference, and two resettable difference memories, a first memory for storing higher values of the difference and a second memory for storing lower values of the difference, and means for comparing each successive difference value with the difference values stored in the first and in the second memories and for replacing the value stored in the higher difference memory with a succeeding difference value higher than the stored difference and for replacing the value stored in the lower difference memory with a succeeding value lower than the stored value, and means for conditioning to a displayable form and for displaying data selected from the group consisting of the saturated temperature corresponding to the pressure, the pressure, the saturated-sensed temperature difference, and the contents of the first and second difference memories.

16. A pressure gage having a casing and a display, said gage comprising;

means for supplying electrical power to the gage, means for connecting the gage to a pressure source whereby a pressure from the source is communicated to the gage, transducer means within the casing for responding to the pressure and generating an electrical output including data related to the pressure, a unitary memory module separate from the gage casing, including interface means, for providing two way communication between the gage and the memory module for receiving data from the gage and for transmitting data to the gage, non-volatile memory means positioned within the module and connected to the interface means for storing pressure data and corresponding saturated temperature data, the data being applicable to a zeotropic volatile fluid, and that the stored temperature data corresponding to each pressure includes both the dew-point temperature, being that temperature of a cold surface exposed to the refrigerant vapor at which the first drop of liquid will begin to condense, and the bubble-point temperature, being that temperature of a pool of liquid refrigerant at which the first bubbles form, means positioned within the gage for transmitting to the module data corresponding to the pressure and for receiving from the memory means saturated temperature data corresponding to the pressure data, and means for conditioning to a displayable form and for displaying data selected from the group consisting of the pressure and a saturated temperature corresponding to the pressure.

17. A pressure gage as recited in claim 16 further providing, temperature sensing means connected to the gage casing, for sensing a temperature value, means within the gage casing for converting the temperature value to data corresponding to the sensed temperature, and means for calculating and displaying superheat comprising the steps of: subtracting the dew-point temperature data from the observed temperature data to secure a difference and conditioning to a displayable form and displaying the difference.

18. A pressure gage as recited in claim 16, further providing, temperature sensing means connected to the gage casing, for sensing a temperature value, means within the gage casing for converting the temperature value to data corresponding to the sensed temperature, and means for calculating and displaying subcooling comprising subtracting the sensed temperature data from the bubble-point temperature data to secure a difference and conditioning to a displayable form and displaying the difference.

19. A pressure gage as recited in claim 16 further providing, means for calculating and displaying saturated temperature comprising taking the average of the bubble-point temperature and the dew-point temperature, and conditioning to a displayable form and displaying the average.

20. A pressure gage as recited in claim 19 where the average is an arithmetic average.

* * * * *